Patented Oct. 3, 1939

2,174,830

UNITED STATES PATENT OFFICE 2,174,830

PROCESS FOR PRODUCING UNSATURATED CARBONYLIC COMPOUNDS

Sumner H. McAllister, Lafayette, and Edwin F. Bullard, Oakland, Calif., assignors to Shell Development Company, San Francisco, Calif., a corporation of Delaware No Drawing. Application August 6, 1937, Serial No. 157,742

15 Claims. (Cl. 260—486)

This invention relates to the dehydration of carbonylic compounds containing at least one carbinol group and especially to the production of unsaturated aldehydes, ketones, organic acids, organic acid esters and substitution products thereof from the corresponding aldols, ketols, hydroxy acids and hydroxy-esters. It provides an improved procedure, particularly adapted to continuous operation, whereby such dehydrations may be efficiently carried out at high throughput rates without sacrifice of yield.

Our invention deals with a distillation process for dehydrating carbonylic compounds containing a carbinol group in which the reaction is effected in the presence of a preponderance of said carbonylic compound over dehydration products thereof. An important object of our invention is the removal of dehydration products in the proportions corresponding to those prevailing in the minimum boiling mixture of these components without adversely affecting the dehydration reaction.

It is another object of our invention to carry out the dehydrations specified under temperature conditons which minimize undesirable side reactions, particularly polymerization, condensation and decomposition reactions, yet promote high reaction rates and prompt removal of reaction products from the reaction zone.

The process of our invention is applicable to the dehydration of any carbonylic compound containing a carbinol group which yields an unsaturated carbonylic compound which forms an azeotrope having a higher ratio of water to unsaturated carbonylic compound than corresponds to the stoichiometric proportion for the dehydration reaction. For the purpose of making our invention more clear, however, it will be described in greatest detail in its applications to the manufacture of unsaturated ketones by dehydration of the corresponding keto-alcohols. But it will be understood that this implies no limitations on the process of our invention as the same principles are applicable to the dehydration of analogous carbonylic carbinols in which an aldehyde or carboxyl or ester group is present in place of, or in addition to, the carbonyl group of such keto-alcohols.

Diacetone alcohol, which is representative of the class of keto-alcohols which on dehydration yield unsaturated ketone and water in a ratio higher than that occurring in the minimum boiling mixture of these compounds, is customarily dehydrated in the presence of a dehydration catalyst, preferably at an elevated temperature. It has been general practice to use the catalyst in dilute aqueous solution and it is the prevalent belief that water must be added to the reactor to maintain a high dilution of both catalyst and keto-alcohol therein. Guinot, in United States Patent 1,913,159, stresses the occurrence of undesirable condensation and depolymerization reactions when extraneous water is not supplied to the reaction. He recommends, page 1, lines 47–48, dehydrating diacetone alcohol by heating it to the boiling point in the presence of a considerable excess of water (a greater weight percent of water than of diacetone alcohol is specified on page 2, lines 10–15) containing a small amount of catalyst so that the minimum boiling azeotrope of mesityl oxide and water distills off and the return (see page 1, lines 87–93) to the reaction vessel of the excess water entrained by the azeotropic mixture so as to maintain the composition of the mixture, with its large excess of water, substantially constant.

We have found that it is not only unnecessary but also undesirable to carry out such dehydrations in the presence of large amounts of water, that is, in an excess of one of the reaction products. Such a procedure materially reduces the capacity of the reactor and favors re-hydration of the unsaturated carbonylic compound produced with consequent reduction in yield. Our process avoids these disadvantages of the prior art teachings and permits of more practical and efficient manufacture of unsaturated carbonylic compounds.

As applied to the manufacture of mesityl oxide, our invention essentially comprises heating a reaction mixture, comprising diacetone alcohol and a dehydration catalyst, containing less water than corresponds to the stoichiometric equivalent of the carbonylic compounds present, i. e. less than 15.5% water based on the diacetone alcohol content and most preferably a substantially anhydrous reaction mixture, by which we mean one containing not more than about 4% water. Reaction mixtures having a water content between about 1 and about 15% are practical. The reaction mixture is heated to a temperature at which the mesityl oxide and water formed are vaporized and removed at the rate at which they are produced but the use of high temperatures which favor undesirable side reactions such as resinification, reversion to acetone, etc. are substantially avoided. The mesityl oxide and water are removed as an overhead product having approximately the azeotropic composition, namely, 65.2 parts of mesityl oxide to 34.8 parts of water, and boiling at about 91.5 to 92° C. we obtain this azeotropic overhead without dilution of the reaction mixture by adding the water necessary to make up the difference between the stoichiometric and azeotropic mesityl oxide: water ratios, which are, on a weight basis 1:0.183 and 1:0.534 respectively, to the still as reflux. Most preferably we use a part of the aqueous layer of the condensed and stratified distillate as the source of the water refluxed as this contains usually about 3.1% mesityl oxide which is thus recovered without additional expense. The remainder of the aqueous phase and the mesityl oxide phase are withdrawn from the system in stoichiometric proportions. A part of the mesityl oxide phase may also be returned as part of the reflux in order to increase the sharpness of the fractionation between unreacted diacetone alcohol and the mesityl oxide-water azeotrope. In this manner the reaction mixture may be maintained preponderantly diacetone alcohol while the still head temperature may be kept at a minimum corresponding to the minimum boiling mixture of the reaction products. It will be appreciated, however, that strict adherence to the azeotropic composition in the overhead product is not necessary in order to secure advantages from the process of our invention but that greater amounts of mesityl oxide may be present, it being only essential that water be returned to the column instead of to the kettle as in prior methods.

In a test of the process of our invention as applied to the continuous dehydration of diacetone alcohol a kettle charge consisting of approximately 2000 parts by weight of diacetone alcohol, 50 parts of sodium bisulfate and 80 parts of water was used. The kettle was brought to a temperature of about 120° C. and diacetone alcohol was then introduced at a rate regulated so as to maintain the charge substantially constant in volume. The mesityl oxide and water formed distilled off continuously and passed to a fractionating column provided with a reflux head designed to act as a separator for the condensate. The still head temperature was regulated so that the mesityl oxide-water azeotrope was taken off as overhead product together with some acetone. A part of the lower layer from the condensate containing 3.1 parts by weight of mesityl oxide to 96.9 parts of water was continuously returned to the column as reflux at a rate regulated so as to maintain the still head at the boiling point of the azeotrope. The remainder of the aqueous layer was withdrawn from the system for separate recovery of its mesityl-oxide content while the upper layer was totally withdrawn and redistilled. The yield of mesityl oxide was 98% of the theoretical and the product was colorless and of high purity. The recovery was 770 gallons of mesityl oxide per pound of sodium bisulfate and the catalyst still appeared to retain substantially its original activity. Production was at the rate of approximately 1 gallon of mesityl oxide per hour per gallon of kettle charge. This was slightly more than double the best capacity obtainable in the same apparatus (one-half volume of mesityl oxide per hour per gallon of kettle charge) when using the prior art procedure of maintaining the charge high in water. Using benzene sulfonic acid, a reaction rate of about 4 volumes of mesityl oxide per hour per gallon of kettle charge was obtained using our improved method of operation.

Even more marked improvements in efficiency and capacity were observed in the application of our process to the manufacture of phorone from 2,6 dimethyl hepten-2-one-4-ol-6. Other ketol dehydrations which may be similarly effected with success, include, for example, the conversion of propionoïn to ethyl propenyl ketone, of acetobutyl alcohol to hexen-4-one-2, or hydracetal acetone to ethylidene acetone, of triacetone alcohol to phorone, of hexandion-2,5-ol-3 to hexen-3-dione-2,5, of chloral acetone to trichlorethylidene acetone, of 2,5 dimethylol cyclohexanone to 2,5-dimethylene cyclohexanone and of α hydroxyl-ethyl-phenyl ketone to acrylylbenzol. Homologues, analogues and suitable substitution products of such ketols may also be used. The ketols may be used in either a crude or pure form and while they are most preferably fed in a substantially anhydrous condition they may, where conditions warrant the resulting reduction in capacity, contain water. Where diacetone alcohol containing substantial amounts of acetone is used it is advantageous to use a tall fractionation column from which the acetone may be removed as top product while the mesityl oxide-water azeotrope is taken off as a side stream, as excessive amounts of acetone in the azeotrope-containing condensate have a homogenizing effect which interferes with stratification and separation of the phases. High boiling impurities in the feed are most preferably removed before they are introduced into the reactor as they tend to accumulate there but they may be tolerated when more frequent change and/or regeneration of catalyst is considered more economical. Ketols may be dehydrated individually or in the form of suitable mixtures. The process of our invention may be carried out continuously, intermittently or batchwise.

Particularly where higher boiling unsaturated carbonylic compounds are being manufactured, it may be advantageous to operate under reduced pressure to facilitate rapid removal of the reaction products without recourse to high temperatures which may favor decomposition. Another method of reducing such decomposition is by shortening the residence time as by preheating the feed. Thus, a vaporized feed may be used.

We generally prefer to use either acid salts such as alkali metal acid sulfates and the like, because of their reduced corrosiveness and minimized resinifying properties or organic acids such as benzene sulfonic acid and the like, because of their miscibility with the reactants which promotes high reaction rates and increased throughput. Other suitable dehydration catalysts may also be used, such, for example, as iodine, hydrochloric acid, tungstic acid, sulfuric acid, phosphoric acid, primary sodium phosphate, zinc chloride, zinc oxide, chromium oxide, aluminum oxide, aluminum phosphate, oxalic acid, calcium chloride, etc. Suitable carriers, distenders or supports may be employed with the catalysts.

Altho we have emphasized the manufacture of unsaturated ketones from ketols in the foregoing description, we do not limit ourselves thereto as the same procedures are applicable generally to any process wherein a carbinol containing carbonylic compound is dehydrated to the corresponding unsaturated carbonylic compound provided only that the unsaturated product forms an azeotropic mixture with water which contains more than the stoichiometric amount of water and which is stratifiable into two phases on condensation. One very important application is in the manufacture of unsaturated esters from esters of hydroxyacids. It furnishes a particularly advantageous method for efficiently producing methacrylic acid esters from the corresponding hydroxyisobutyric acid esters. These unsaturated esters are valuable starting materials in the manufacture of synthetic resins and plastics because of their great tendency to polymerize, which tendency increases the difficulty of their production from hydroxyisobutyric acid esters. By the process of our invention, however, they may be efficiently produced in high yields with very little loss thru resinification or other undesirable side reactions. Ethyl methacrylate, for example, which forms a binary minimum boiling mixture with water containing 79.4% ethyl methacrylate and 20.6% water by volume and boiling at 88.1°, may be produced from ethyl hydroxyisobutyric acid by a process similar to that described for the manufacture of mesityl oxide, using most preferably, however, sulfuric or phosphoric acid as the catalyst. In this case, higher proportions of catalyst to hydroxyester, as much as equimolecular proportions or even more, may be advantageously used. The return to the column of about 0.116 pound of water per pound of ethyl methacrylate produced is necessary in order to maintain the still head at the boiling point of the azeotrope and insure the removal of a top product of azeotropic composition. Other unsaturated esters which may be produced in an analogous manner include, for example, allyl acrylate from propylene glycol monoacetate or allyl lactate from propylene glycol monoacrylate, isopropyl methacrylate from isopropyl esters of α or β hydroxyisobutyric acid, ethyl vinyl acetate from ethyl γ hydroxybutyrate, crotyl acetate from α butylene glycolmonoacetate, γ methyl crotyl acetate from γ isoamylene glycol α monoacetate, and the corresponding unsaturated esters from the higher homologues, analogues and substitution products of such hydroxy-esters including the acid sulfates, acid phosphates, etc., of hydroxy-esters. Instead of the hydroxy-esters, hydroxy-acids may be used, thus β hydroxybutyric acid may be converted by the process of our invention to isocrotonic acid and α hydroxyisovaleric acid may be dehydrated to ββ dimethylacrylic acid or α,β dimethyl β hydroxyvaleric acid may be used to prepare α,β dimethyl β ethylacrylic acid. Typical of dehydrations of hydroxyaldehydes which may be successfully effected by the process of our invention are, for example, the manufacture of tiglic aldehyde from acetopropionic aldol and of β methyl crotonaldehyde from hydroxyisovaleraldehyde.

It will be apparent that the process of our invention offers many advantages over prior dehydration procedures. It permits greater throughputs in a given apparatus, requires lower heat input and gives higher conversions as a result of the suppression of side reactions. It is simple to operate as smooth uniform operation may be readily achieved by regulation of the refluxed aqueous layer (which may be automatic) in accordance with the still head temperature. The invention is not only capable of wide variation with respect to the type of carbinol containing carbonylic compounds which may be obtained but also the operating arrangement and conditions may be suitably modified, without departing from the spirit of our invention which is not to be regarded as limited to the details of operation described, nor is it dependent upon the soundness or accuracy of the theories advanced as to the advantageous results attained. On the other hand, the invention is to be regarded as limited only by the terms of the accompanying claims, in which it is our intention to claim all novelty inherent therein as broadly as is possible in view of the prior art.

We claim as our invention:

1. In a distillation process for the catalytic dehydration of a carbinol containing carbonylic compound to an unsaturated carbonylic compound which forms an azeotrope with water which contains a higher ratio of water to unsaturated carbonylic compound than the stoichiometric ratio, the steps of distilling a reaction mixture containing a preponderance of said carbinol containing carbonylic compound in the presence of a dehydrating catalyst, passing the distillate into a column and adding sufficient water to the distillate in the column to make the composition of the top product substantially correspond with that of said azeotrope.

2. In a distillation process for the catalytic dehydration of a carbinol containing carbonylic compound to an unsaturated carbonylic compound which forms an azeotrope with water which contains a higher ratio of water to unsaturated carbonylic compound than the stoichiometric ratio, the step of employing as reflux medium sufficient of the stratified aqueous phase obtained by condensation of the distillate to make the composition of the top product substantially correspond with that of said azeotrope.

3. In a distillation process for the catalytic dehydration of a carbinol containing carbonylic compound to an unsaturated carbonylic compound which forms an azeotrope with water which contains a higher ratio of water to unsaturated carbonylic compound than the stoichiometric ratio, the step of adding to the distillate in the distillation column sufficient of the aqueous phase obtained by stratifying the condensed distillate, to make the composition of the top product substantially correspond with that of said azeotrope.

4. In a continuous distillation process for the catalytic dehydration of a carbinol containing carbonylic compound to an unsaturated carbonylic compound which forms an azeotrope with water which contains a higher ratio of water to unsaturated carbonylic compound than the stoichiometric ratio, the steps of heating a mixture of said carbinol containing compound and a dehydration catalyst containing between 1 and 4% water at a temperature at which the unsaturated carbonylic compound and water formed are vaporized and refluxing a part of the water content of the condensate at such a rate as to maintain a still head temperature approximating that of the boiling temperature of said azeotrope at the operating pressure.

5. A process for dehydrating a ketol which comprises heating a ketol in the presence of a dehydration catalyst and less than an equal molecular amount of water at a temperature at which the unsaturated ketone and water formed are vaporized into a distillation column and adding sufficient water to said vapors in the column to form an azeotropic unsaturated ketone-water mixture therein.

6. In a continuous process for dehydrating a ketol by distillation in the presence of a dehydration catalyst the step of adding as reflux medium sufficient of the stratified aqueous phase obtained by condensation of the distillate to make the composition of the top product substantially correspond with that of the binary water azeotrope of the unsaturated ketone formed in the reaction.

7. A continuous process for dehydrating a ketol of at least six carbon atoms by distillation in the presence of a dehydration catalyst which comprises maintaining a water content of between about 1 and 15% in the reaction mixture and adding as reflux medium sufficient of the stratified aqueous phase obtained by condensation of the distillate to make the composition of the top product substantially correspond with that of the binary water azeotrope of the unsaturated ketone formed in the reaction.

8. A process for dehydrating diacetone alcohol which comprises distilling mesityl oxide and water from a reaction mixture containing a dehydrating catalyst and a preponderance of diacetone alcohol, adding sufficient water as reflux to the distillate in the distillation column to make the composition of the top product substantially correspond with that of the mesityl oxide-water azeotrope and withdrawing mesityl oxide and water from the system in substantially stoichiometric proportions.

9. In a continuous distillation process for dehydrating diacetone alcohol in the presence of a dehydration catalyst, the step of employing as reflux medium the stratified aqueous phase obtained by condensation of the distillate to make the composition of the top product substantially correspond with that of the mesityloxide-water azeotrope.

10. In a continuous distillation process for dehydrating diacetone alcohol in the presence of a dehydration catalyst, the step of returning to the column as reflux sufficient water to maintain a still head temperature below about 92° C.

11. In a continuous distillation process for dehydrating diacetone alcohol in the presence of a dehydration catalyst, the step of maintaining in the reaction mixture a water content between about 1 and about 15%.

12. In a continuous distillation process for dehydrating a hydroxy ester in the presence of a dehydration catalyst, the step of employing as reflux medium sufficient of the stratified aqueous phase obtained by condensation of the distillate to make the composition of the top product substantially correspond with that of the binary azeotrope of water and the unsaturated ester formed in the reaction.

13. In a continuous distillation process for dehydrating a hydroxy ester in the presence of a dehydration catalyst, the step of adding to the distillate in the distillation column sufficient water to form therein a binary unsaturated ester-water azeotrope of the unsaturated ester formed during the reaction.

14. In a continuous distillation process for dehydrating a hydroxyisobutyric acid ester in the presence of a dehydration catalyst, the step of employing as reflux medium sufficient of the stratified aqueous phase obtained by condensation of the distillate to make the composition of the top product substantially correspond with that of the binary azeotrope of water and the methacrylate formed in the reaction.

15. In a continuous distillation process for dehydrating ethyl hydroxyisobutyrate in the presence of a dehydration catalyst, the step of employing as reflux medium sufficient of the stratified aqueous phase obtained by condensation of the distillate to make the composition of the top product substantially correspond with that of the binary ethyl methacrylate-water azeotrope.

SUMNER H. McALLISTER,
EDWIN F. BULLARD.